//patent header omitted

3,393,222
PROCESS FOR THE PRODUCTION OF NITRILES
Hans-Helmut Schwarz, Krefeld, and Hermann Schnell, Krefeld-Urdingen, Germany, assignors to Farbenfabriken Bayer Aktiengesellschaft, Leverkusen, Germany, a corporation of Germany
No Drawing. Filed June 2, 1965, Ser. No. 460,831
Claims priority, application Germany, July 23, 1964, F 43,536
3 Claims. (Cl. 260—465.2)

ABSTRACT OF THE DISCLOSURE

Introduction of molten carboxylic acid into a fluidized nitrile synthesis catalyst at a temperature above 200° C. while maintaining fluidization of said catalyst with ammonia gas, the amount of ammonia gas employed being 3 to 30 times the theoretical quantity required for reaction with said carboxylic acid to produce the corresponding nitrile.

---

Nitriles, particularly adipic acid dinitrile, are produced in known manner by reacting mono- or dicarboxylic acids with ammonia in the presence of catalysts.

The production of adipic acid dinitrile from adipic acid and ammonia in the presence of a catalyst in the gas phase is attended by difficulties caused by the thermal decomposition of the adipic acid at fairly high temperatures, particularly at temperatures above about 200° C. In this case, cyclopentanone is formed inter alia by decarboxylation. This compound polymerizes and leads to the precipitation of resins. Such decomposition is catalyzed by a number of metals, for example iron. In order to reduce the losses caused by decomposition, melting, vaporization and other reactions involving the adipic acid, the production of nitrile has to be carried out as quickly as possible.

There are several processes by which decomposition may be avoided. For example, it has been proposed to produce adipic acid dinitrile by introducing powdered or molten adipic acid into a space heated to 325° to 350° C. into which ammonia heated to 500° C. is introduced in countercurrent and the ammonia carries these gases along to the space filled with catalyst.

A similar process is known, according to which molten adipic acid is pumped through a nozzle surrounded by a coaxial tube. Ammonia heated to between 450 and 500° C. is introduced through this annular gap, and it carries the molten acid along with it in the form of droplets and vaporizes it.

The object of a number of known processes is to produce rapid vaporization of the adipic acid into thin films by throwing molten or powdered adipic acid against heated walls by means of, for example, high-speed rotor blades.

In all these known processes, there is a fairly long time interval between vaporization and the reaction between the vaporized adipic acid and the ammonia on the catalyst, during which the adipic acid is decomposed.

It has now been found that these disadvantages may be obviated if the carboxylic acid is introduced in molten form into a moving or fluid catalyst bed which is kept in the fluidized state by ammonia gas. At the reaction temperatures used, the carboxylic acid vaporizes very quickly in contact with the catalyst and reacts immediately with the ammonia present in excess to form the corresponding dinitrile. Not only does this process eliminate the losses of carboxylic acid through decomposition during vaporization, it also dispenses with additional apparatus for the vaporization of the carboxylic acid.

Any type of apparatus commonly used in the fluid bed technique may be employed. The term fluid or moving bed also covers the "fluidized bed" concept.

The ammonia gas required for the reaction and to keep the catalyst in motion may contain fairly small amounts of inert gases such as, for example, nitrogen and water vapour.

The formation of the nitrile from the carboxylic acid is an equilibrium reaction, and a quantity of ammonia amounting to about 3 to 30 times the theoretical quantity is required for a thorough reaction to form the nitrile.

The reaction is carried out at temperatures above 200° C. Thus, for example, the most favorable temperature for the reaction of the adipic acid to adipodinitrile is about 360° C.

The process may be carried out at high pressures and even in vacuum.

Any catalyst which is suitable for the synthesis of nitriles and which can be fluidized may be used as the catalyst. Examples of suitable catalysts are silica gel, boron phosphate or alkali containing silica gels and aluminum oxides impregnated with acids or esters such as phosphoric acid and phosphorus esters and boron phosphate. Silica gels impregnated with molybdenum, tungsten, vanadium and titanium salts, are also catalytically active. Silica gels containing 0.1 to 30% of phosphoric acid, are particularly effective.

The carboxylic acid may be introduced into the fluid or moving bed of catalyst at any point, for example, on to the surface of the fluid bed or at a point beneath it, providing its temperature does not exceed a certain degree as it flows to the moving bed.

If the carboxylic acid is added dropwise onto the surface of the fluidized catalyst, it would be possible, in the event of only partial reaction of the carboxylic acid, to react the rest of this acid in an adjacent, second catalyst bed.

Generally, all mono- and polycarboxylic acids, which, at the reaction temperature, are liquid or meltable without too fast decomposition or polymerization, may be used according to the present invention for the production of the corresponding nitriles. For example, there may be mentioned: acetic acid, phenyl-acetic acid, propionic acid, butyric acid, isobutyric acid, valeric acid, isovaleric acid, the capronic acids, the oenanthic acids, lauric acid, palmitic acid, stearic acid, malonic acid, succinic acid, glutaric acid, adipic acid, pimelic acid, suberic acid, azelaic acid, sebacic acid, nonane-dicarboxylic acid, dodecane-dicarboxylic acid, benzoic acid, chlorobenzoic acid, cinnamic acid and trimellitic acid. The process according to the present invention is especially suitable for the production of nitriles of such acids which easily decompose at high temperatures, such as, for instance, glutaric acid, adipic acid, suberic acid, sebacic acid, nonane- and dodecanedicarboxylic acid and benzoic acid. The production of adipic acid dinitrile is the most interesting process.

EXAMPLE 1

100 g. of a silica gel containing 5.9% of phosphoric acid are suspended by 390 Nl./h. of ammonia gas heated to 360° C. in a heatable, 6 cm. diameter fluidization reactor. 75.5 g. of molten adipic acid are added dropwise to the moving catalyst over a period of one hour. Heating of the fluid or moving bed is controlled in such a way that the temperature of the catalyst is 360° C. The vapour mixture issuing from the fluidization reactor is cooled to 20° C., resulting in the precipitation of an aqueous and an organic layer in which 49.6 g. of adipic acid dinitrile and 3.02 g. of adipic acid are detected by analysis. This corresponds to a yield of 90%, based on reacted adipic acid, and to a reaction rate of this acid of 96%. The cooled ammonia from which the reaction products have been removed is recycled after heating into the fluid or moving bed.

EXAMPLE 2

130 ml. of a silica gel containing 10% of phosphoric acid was suspended with 390 Nl./h. of ammonia gas heated to 360° C. in an apparatus of the type described in Example 1. 66.6 g. of molten adipic acid per hour are added dropwise to the fluid or moving bed. Heating is controlled in such a way that the catalyst has a temperature of 360° C. Two layers in which 43.4 g. of adipic acid dinitrile and 5.8 g. of adipic acid are detected by analysis, are obtained from the vapours issuing from the fluidization reactor after cooling to 20° C. This corresponds to a reaction rate of 91.3% and to a yield of 96.5%, based on reacted adipic acid. The cooled ammonia from which the reaction products have been removed is recycled after heating into the fluid or moving bed.

EXAMPLE 3

130 ml. of a silica gel containing 5.3% of phosphoric acid are suspended with 150 Nl./h. of ammonia gas heated to 360° C. in an apparatus of the type described in Example 1. 112 g. of molten adipic acid per hour are added dropwise to the fluid or moving bed. Heating is controlled in such a way that the catalyst has a temperature of 360° C. Two layers in which 65.8 g. of adipic acid dinitrile and 5.05 g. of adipic acid are detected by analysis, are obtained from the vapours issuing from the fluidization reactor after cooling. This corresponds to a reaction rate of 95.5% and to a yield of 79.3%, based on reacted adipic acid. The cooled ammonia from which the reaction products have been removed, is recycled after heating into the fluid or moving bed.

EXAMPLE 4

130 ml. of a silica gel containing 5.5% of phosphoric acid are suspended with 390 Nl./h. of ammonia gas heated to 360° C. in an apparatus of the type described in Example 1. 108.3 g. of molten sebacic acid per hour are added dropwise to the fluid or moving bed. Heating is controlled in such a way that the catalyst has a temperature of 360° C. Two layers in which 1.6 g. of sebacic acid and 69.8 g. of sebacic acid dinitriles are detected by analysis, are obtained from the vapours issuing from the fluidization reactor after cooling. This corresponds to a reaction rate of 98.5% and to a yield of 80.6%, based on reacted sebacic acid.

Other acids, as mentioned above, may be treated correspondingly, if desired, using other catalysts as mentioned in the description.

What we claim is:

1. In the process for producing carboxylic acid nitrile by reacting ammonia with a carboxylic acid which is meltable without substantial decomposition or polymerization, at temperatures above 200° C. in the presence of a nitrile synthesis catalyst, the improvement which comprises contacting said carboxylic acid in molten form with said catalyst which is fluidized by ammonia gas and removing resulting carboxylic acid nitrile, the amount of ammonia present for fluidization of the catalyst and reaction being 3 to 30 times the theoretical quantity required for reaction with said carboxylic acid to form the corresponding nitrile.

2. The process of claim 1 wherein the carboxylic acid is glutaric acid, adipic acid, suberic acid, sebacic acid, nonane dicarboxylic acid, dodecanedicarboxylic acid or benzoic acid.

3. The process of claim 1 wherein the carboxylic acid is adipic acid, the catalyst is silica gel containing phosphoric acid and the temperature is about 360° C.

References Cited

UNITED STATES PATENTS

| | | | |
|---|---|---|---|
| 2,744,925 | 5/1956 | Toland | 260—465 |
| 2,770,641 | 11/1956 | McKeever et al. | 260—465 |
| 3,076,014 | 1/1963 | Kroeper et al. | 260—465 |
| 3,242,204 | 3/1966 | Decker et al. | 260—465.2 |
| 3,325,531 | 6/1967 | Mather et al. | 260—465.2 |

JOSEPH P. BRUST, *Primary Examiner.*